United States Patent Office 3,600,311
Patented Aug. 17, 1971

3,600,311
HYDROCARBON SYSTEMS CONTAINING BRANCHED ALKYLENE POLYMERS
Michael I. Naiman, William J. Heintzelman, and Robin A. McLaren, St. Louis, Mo., assignors to Petrolite Corporation, Wilmington, Del.
No Drawing. Continuation-in-part of appplication Ser. No. 432,002, Feb. 11, 1965. This application Sept. 3, 1968, Ser. No. 757,086
Int. Cl. C10m 1/18
U.S. Cl. 252—59       12 Claims

ABSTRACT OF THE DISCLOSURE

A hydrocarbon system normally subject to the uncontrolled deposition of wax which is improved by the presence therein of a composition comprising branched alkylene polymers, for example alkylene polymers characterized by (1) a molecular weight of about 1,000–50,000; (2) about 90–45%

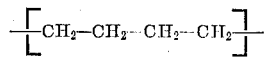

units, and (3) about 10–55%

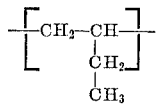

units.

These polymers are prepared, for example, from hydrogenated polybutadienes.

These systems include, for example, the use of these branched alkylene polymers as pour point depressants, for example in petroleum distillates; as viscosity improvers for lube oils; as paraffin deposition inhibitors in petroliferous fluids, and the like.

---

This invention relates to a hydrocarbon system normally subject to the uncontrolled deposition of wax which is improved by the presence therein of a composition comprising branched alkylene polymers for example alkylene polymers characterized by (1) a molecular weight of about 1,000–50,000 (2) about 90–45%

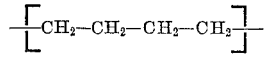

units, and (3) about 10–55%

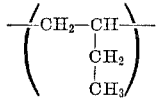

units. These polymers are prepared, for example, from hydrogenated polybutadienes.

These systems include, for example, the use of these branched alkylene polymers as pour point depressants, for example in petroleum distillates; as viscosity improves for lube oils; as paraffin deposition inhibitors in petroliferous fluids; and the like.

This application is a continuation-in-part of our S.N. 432,002, filed Feb. 11, 1965 now abandoned.

Methods of the preparation of polybutadienes are well known. In general, butadiene is polymerized to yield the following type polymers.

(1) The 1–4 addition, forming a straight chain unsaturated hydrocarbon

(2) The 1–2 addition, forming a saturated carbon chain with lateral vinyl groups which may be arranged regularly or irregularly

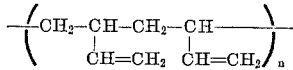

(3) The combined 1–2 and 1–4 addition

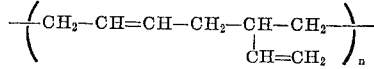

Various teachniques have been employed to polymerize butadiene including emulsion, bulk and solution polymerization. In addition, many catalysts have been employed including free radical and ionic catalysts, for example peroxides, azo compounds, alkali metals, alkali-organics such as alkali-alkyls, organo-metallics, etc.

We have now discovered unique branched alkylene polymers which can be prepared from corresponding unsaturated polymers. These branched alkylene polymers are hydrogenated polybutadienes having a certain degree of branching and a certain molecular weight. They are prepared by polymerizing butadiene in a suitable solvent (which does not adversely affect the polymerization, for example a hydrocarbon solvent), in the presence of a suitable organo-metallic catalyst, for example a lithiumhydrocarbon catalyst and preferably in the presence of a Lewis base. This product is then hydrogenated to yield the corresponding saturated branched alkylene polymer. Hydrogenation is carried out in the conventional manner, for example with hydrogen, in the presence of a suitable catalyst such as a nickel catalyst.

The branched alkylene polymer of this invention is prepared by the following sequence of reactions:

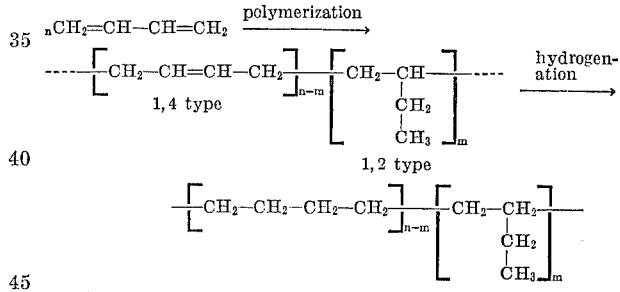

The molecular weight of the product is, for example, from about 1000 to 50,000, or greater, such as from about 1,500 to 20,000, advantageously from about 2,000 to 12,500, but preferably from about 3,000 to 10,000.

The fraction of 1,2 type addition present in the polymer is advantageously from about 10 to 55% of the total units (i.e. the sum of both 1,2- and 1,4-type units) of the polymers, such as from about 15 to 50% and preferably from about 20–45, with an optimum of from about 35–40%.

For optimum performance in certain uses there is an inter-relationship between the amount of branching and molecular weight. This is illustrated in the case of pour point depressants for middle distillates. Thus, a polymer having 15% 1,2 type addition and a molecular weight of 7,000 is not as effective as one having 35% 1,2 type addition and a molecular weight of 7,000. However, effectiveness decreases after a certain degree of branching and a molecular weight is reached. Thus, where branching exceeds about 40% and the molecular weight exceeds 10,000, performance as a pour point depressant tends to decrease. At lower branching the effectiveness as a pour point depressant may tend to decrease where the molecular weight exceeds 3,000. In practice we employ a polymer having a molecular weight of 7,000–8,000 and 35–40% 1,2-type addition.

The structure of the polymer presented in the formula is merely the total fraction of 1,2-type units to total units in the polymer. It does not represent the actual arrangement of the units in the molecule such as whether they are random, block, etc. The actual arrangement of the units in each molecule is not known. However, it is believed that for the uses intended in this invention, the important factor is the molecular weight and the ratio of the type of units inter se rather than the actual arrangement of the units. The preferred polymer is prepared according to the procedures described herein.

The block polymers specifically prepared herein by controlling the presence and concentration of the Lewis base are also effective for the uses of this invention.

The lithium-based catalysts of this invention are metallic lithium, organolithium compounds, or other compounds of lithium in which lithium can displace hydrogen from water. "Organolithium compounds," as used herein, include the various lihtium hydrocarbons, i.e., hydrocarbons in which one or more hydrogen atoms have been replaced by lithium, and adducts of lithium with polycyclic aromatic compounds. Suitable lithium hydrocarbons are for instance, alkyl lithium compounds such as methyl lithium, ethyl lithium, butyl lithium, amyl lithium, hexyl lithium, 2-ethylhexyl lithium and n-hexyl-decyl lithium. In addition to the saturated aliphatic lithium compounds, unsaturated compounds are also suitable such as allyl lithium and methallyl lithium. Aryl, alkaryl and aralkyl lithium compounds such as phenyl lithium, the several tolyl and xylyl lithiums, and alpha- and beta-naphthyl lithium are also suitable. Mixtures of the various hydrocarbon lithium compounds are also suitable. For instance, a catalyst can be prepared by reacting an initial hydrocarbon lithium compound successively with an alcohol and with an olefin such as propylene (i.e. a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene dilithium compounds such as methylene dilithium, ethylene dilithium, trimethylene dilithium, pentamethylene dilithium, hexamethylene dilithium, decamethylene dilithium, octadecamethylene dilithium and 1,2-dilithium propane. Other suitable polylithium hydrocarbons are polylithium aryl, aralkyl and alkaryl compounds such as 1,4-dilithium benzene, 1,5-dilithium naphthalene, 1,2-dilithium-1,3-diphenyl propane, etc.

Tri- and higher lithium hydrocarbons are also suitable, such as 1,3,5 - trilithium pentane or 1,3,5 - trilithium benzene. Likewise, there may be employed the lithium polynuclear aromatic hydrocarbon adducts produced by simply reacting lithium metal with naphthalene, anthrecene and the like polynuclear aromatic hydrocarbons. The hydrocarbon acquires a negative charge without losing any of its hydrogens, and serves as the anion, the lithium losing an electron to serve as the cation, of the salt. It should be understood that metallic lithium or the various lithium compounds may be used either alone, or in any combination as mixtures with each other. In practice we prefer to employ alkyl lithium compounds such as butyl lithium.

The concentration of the lithium catalyst employed can vary widely depending on the particular catalyst employed, reaction conditions, the product desired, etc. For example we can employ concentrations of catalysts (based on solvent and actual weight of lithium in the catalyst) of about 0.001 to 10% or greater, such as about 0.02 to 5% with an optimum of about 0.05 to 2.5%.

Lewis bases which can be employed include ethers, thioethers, and tertiary amines for example in concentrations of about 0–100%, such as about 25–100%, by weight, advantageously about 0 to 30% but preferably about 0.5 to 20%, based on solvent. However, the actual concentration of the Lewis base will depend on the particular Lewis base used and the polymer desired.

The organic ethers that are eployed include alkyl, aryl, aralkyl, alkaryl, and cyclic ethers such as dioxane and tetrahydrofuran. Ethers of glycols may also be employed, for example, the dimethyl ether of diethylene glycol, etc. Corresponding thioethers can also be employed.

The tertiary amines that can be used include trimethyl amine, triethyl amine, trialkyl amines, generally, and cyclic tertiary amines such as pyridine and quinuclidine. These are employed in the same amount as the ethers.

Aromatic aliphatic and alicyclic hydrocarbon solvents can be employed. Alicyclic solvents include cyclohexane which is the preferred solvent. Aromatic solvents include heptane, pentane, butane, hexane, etc. Solvents such as cyclopentadiene should be avoided.

Temperatures in the range of 10–100° C. may be used. In practice, the reaction is carried out at ambient temperatures and the reaction allowed to exotherm to about 60° C. Pressures of atmospheric to 10 or 20 atmospheres are employed so as to maintain a high concentration of the reactants in the liquid phase. The concentration of the butadiene in the solvent may vary widely such as from about 5–75%, for example about 10–60%, but preferably 12–40%.

The polymerization is carried out in an inert atmosphere, in the absence of air, carbon dioxide, oxygen, etc. It may be carried out under an atmosphere of an inert gas such as pure nitrogen, helium, argon, etc., in vacuum, or under a pressure of inert organic materials.

When a polymer of the desired structure has been prepared, the polymerization may be terminated by the addition of a trace of water or alcohol and the product isolated by standard techniques. Such techniques may be effected by precipitation into a non-solvent, by flashing off solvent, by a slurry technique with a hot non-solvent, etc. The polymer is then stabilized. dried and packaged in the conventional manner.

In addition the polybutadiene can be directly hydrogenated without separating the polybutadiene from solution. Thereupon the hydrogenated polymer can be separated from solution by standard procedures.

The following examples are presented for purposes of illustration and not of limitation.

EXAMPLE 1

A dry, sealed beverage bottle was charged with 200 ml. of cyclohexane and 10 ml. of butadiene (6.5 g., 0.120 mole) under argon. Dry diethyl ether (1.0 ml.) and butyllithium (4.35 ml. of a 2.3 M solution in n-hexane, 0.010 mole) were successively added and the bottle shaken for 2 hours. A further 30 ml. of butadiene (19.5 g. 0.361 mole) was added and the shaking continued for a further 18 hours. Isopropanol (10 ml.) containing anti-oxidant (Plastinox 2246) was then added, the pressure released and the contents of the bottle poured into 400 ml. of methanol with stirring. The methanol was decanted and the precipitated polymer washed three times with methanol containing anti-oxidant. The polymer was dried in a rotary evaporator of 50–70° C. Infrared analysis showed it to contain 25% vinyl groups. Molecular weight was 2730 (number average).

The polymer was dissolved in 100 ml. cyclohexane and hydrogenated at 40 p.s.i. and 70° using 0.6 g. of 5% palladium on charcoal as catalyst.

EXAMPLE 2

A beverage bottle was charged with 200 ml. cyclohexane, 10 ml. of butadiene (0.120 mole), 5 ml. of diethyl ether and 2.6 ml. of 2.3 M butyllithium in n-hexane. It was shaken for two hours, a further 30 ml. (0.361 mole) of butadiene added and the shaking continued for a further 4 hours. The polymer was isolated as described in Example 1. The number average molecular weight was 3430 and the vinyl content 37%. Hydrogenation was carried out as in Example 1.

EXAMPLE 3

The charge consisted of 200 ml. cyclohexane, 10 ml. of butadiene, 1.0 ml. of dioxane and 8.0 ml. of 0.5 M butyllithium in cyclohexane. The bottle was shaken for 1½ hours, 30 ml. butadiene added and the shaking continued for two hours. The polymer was isolated as described in Example 1. The molecular weight was 5000 and the vinyl content 37%. Hydrogenation was carried out as in Example 1.

EXAMPLE 4

The charge and reaction conditions were the same as in Example 3. After completion of the reaction, 0.5 ml. of methanol was added and the solution hydrogenated without isolation of the polymer using 1 g. of 5% Pd/C as catalyst. The product was identical with that of Example 3.

Other polybutadienes are similarly prepared and hydrogenated. These are illustrated by the following examples. To save a repetitive presentation of details they are presented in tabular form.

TABLE I

| Example | Percent 1, 2 type | Molecular weight (number average) |
|---|---|---|
| 5 | 35 | 7,000 |
| 6 | 40 | 10,000 |
| 7 | 50 | 7,500 |
| 8 | 30 | 12,500 |
| 9 | 45 | 8,000 |
| 10 | 35 | 11,000 |
| 11 | 36 | 40,500 |

In preparing block polymers in accord with this invention, the first block of a block homopolymer is prepared by polymerizing butadiene with either one of the following catalyst system, (1) a lithium hydrocarbon in a solvent consisting of hydrocarbons plus a Lewis base such as ethers or tertiary amines. If catalyst system (1) has been used in the first step, the (2) second block polymerization process is performed by permitting polymerization to continue with fresh monomer added at this point accompanied by the addition of ether or tertiary amine without any additional lithium hydrocarbon. If catalyst system (2) has been used in the first block step, the initially present ether or tertiary amine is first removed from the reaction mixture, and the additional monomer is added now without any additional lithium hydrocarbon. The lithium hydrocarbon initiator, is added in the first step of the polymerization. Thereafter the block polymerization is carried out only by monomer addition. Polymer structure is controlled by the periodic presence, and absence or changed concentration of Lewis base such as ether and/or amine. Thus considering the hydrocarbon solvent alone as one solvent system and the solvent with Lewis base as another, the alternation of solvent systems controls the structure. If desired, the block copolymer consisting of two blocks at this stage such as A–A–A–A–B–B–B–B, where A and B differ only structurally, may now be isolated by the usual procedure, or alternately, the further block copolymerization may be continued in the fashion indicated to produce multi-block copolymers. It will be obvious that the length of the blocks can be controlled by the amount of monomer used in the particular step of the block copolymerization, while the structure of the block is determined by the above-described specific conditions of polymerization.

The following examples illustrate the preparation of block polybutadienes and hydrogenated polybutadienes.

In general, less branching is experienced with none or little Lewis acid such as ether, and increased branching with increased concentrations of Lewis acid.

In Example 12, no ether is employed in the first polymerization stage whereas ether is then employed in the second polymerization stage resulting in less branching in the first stage and more branching in the second stage.

In Example 13, ether is employed in all stages of polymerization but the concentration of ether is increased during the polymerization thus resulting in a greater degree of branching during the period of higher ether concentration.

EXAMPLE 12

A beverage bottle was charged with 200 ml. of cyclohexane, 10 ml. (0.120 mole) of butadiene and 8 ml. of 0.5 M butyl lithium in n-hexane. The mixture was shaken for 2 hours, a further 20 ml. (0.240 mole) of butadiene was added and the shaking continued for an additional 16 hours. Dioxane (5 ml.) and 10 ml. (0.120 mole) of butadiene were successively added and shaking was continued for 5 hours. The polymer was isolated and hydrogenated as in Example 1.

EXAMPLE 13

The charge comprised 200 ml. cyclohexane, 2 ml. diethyl ether, 10 ml. butadiene and 8 ml. 0.5 M butyllithium. This mixture was shaken for two hours. Then 10 ml. butadiene was added and the mixture shaken for an additional 16 hours. Dioxane (2 ml.) and butadiene (20 ml.) was then added and shaking continued for five hours. The polymer isolated as in Example 1 has an average vinyl content of 36%.

This polymer was hydrogenated as in Example 1.

In summary, the present invention relates to branched alkylene polymers having molecular weights of about 1,000 to 50,000, but advantageously about 2,000 to 12,500 with an optimum of 3,000 to 10,000. In practice, the optimum molecular weight depends on the amount of branching. The amount of branching (fraction of 1,2- to total addition) in the corresponding polybutadiene is 10–55%, but preferably 25–45%, with an optimum of 35–40%. These are prepared by hydrogenating polybutadiene which is prepared by polymerizing butadiene in a hydrocarbon solvent, such as alkanes, cycloalkanes, aromatic solvents, etc., but preferably in cycloalkanes for example cyclohexane. The polymerization is carried out in the presence of an organometallic catalyst such as a lithium hydrocarbon, and preferably an alkyllithium such as a butyllithium. The reaction is preferably carried out in the presence of a Lewis base such as ethers, thioethers, and tertiary amines, including both the aliphatic and cyclic species thereof, but preferably dialkylethers such as diethylether and cyclic ethers such as dioxane. The concentration of the butadiene in the solvent is from about 5 to 75%, but preferably 10 to 60%, with an optimum of 12 to 40%. The concentration of the lithium catalyst is from 0 to 10% but preferably about 0.02 to 5% with an optimum of about .05 to 2.5% based on solvent. The concentration of Lewis base in the polymerization is from 0 to 100%, but preferably 0 to 30% with an optimum of 0.5 to 20%. The polymerization is carried out at −10 to 100° C. but preferably at ambient temperatures up to about 60° C. employing atmospheric pressure or a slight superatmospheric pressure.

Hydrogenation of the polybutadiene is generally carried out in the solution derived from polymerization, employing conventional hydrogenation catalysts, preferably nickel, platinum, palladium, etc. and hydrogen pressure of about 25 to 2,000 p.s.i but preferably about 50 to 1500 p.s.i. with an optimum of about 100 to 1000 p.s.i. and a temperature of about 25–200° C., but preferably about 50 to 150° C. Optimum conditions will depend upon, among other factors, the particular hydrogenation catalyst employed, etc.

All of the molecular weights determined herein are number average molecular weights, determined by the method acknowledged to be best for the particular molecular weight range—namely vapor pressure osmometry. These were determined in accordance with "Molecular Weight Measurements by Vapor Pressure Osmometer" by Kume and Kobayashi, Makromolecular Chemie, Bd 79, pp. 1–7, inclusive, (1964) employing the vapor pressure osmometer shown and described as the Model 302 Vapor Pressure Osmometer on pages 44 and 45 of the Hewlett-Packard Electronic, Analytical, Medical 1968 Catalog.

USE AS A POUR POINT DEPRESSANT

The present invention also relates to improving the flow at low temperatures and the pour point characteristics of middle distillates. More particularly, the invention relates to the preparation of improved low cold test hydrocarbon fuels, in particular heating oils and diesel fuels, aviation, and other fuels that are subject to low temperatures.

With increases in the use of hydrocarbon fuels of all kinds, a serious problem has arisen in areas frequently subject to low temperatures in the cold temperature characteristics of fuels. Particularly serious problems have been encountered by heating oils and diesel fuels that have too high a pour point, resulting either in distributional or operating difficulties or both. For example, the distribution of heating oils by pumping or syphoning is rendered difficult or impossible at temperatures around or below the pour point of the oil. Furthermore, the flow of oil at such temperatures through the filters cannot be maintained, leading to the failure of the equipment to operate.

Thus, the present invention improves the pour point of middle distillates and lighter fuels by incorporating the alkylene polymers in the fuel. The boiling ranges of these oils are generally about 250° to 750° F. The petroleum distillates fuels in which the additive materials of the invention are employed contain a major proportion, at least 95%, of liquid hydrocarbons boiling at temperatures between about 70° F. and about 750° F. These fuels include gasolines such as aviation, marine and automotive or motor gasolines, aviation fuels such as JP-1, JP-4, and JP-5 fuels, and diesel fuels such as marine, stationary and automotive diesel engine fuels. Aviation fuel consists of at least 95% of a mixture of volatile hydrocarbons. It is defined by U.S. Military Specifications MIL-F-5616 and MIL-F-5624 C. Its volatility is such that its end point does not exceed 572° F. Its viscosity is between 0.5 and 1.5 centistokes at 100° F.

Diesel fuels as referred to in connection with the invention consist of at least 95% of a mixture of hydrocarbons boiling between 250° F. and 750° F. either by ASTM Method D 86–56 when their end points do not exceed 600° F. or by ASTM Method D–158–54. Diesel fuels are defined by ASTM Specification D–75–53T and fall into Grades 1D, 2D and 4D, in all of which the additive materials of the invention may be used. They have viscosities between 1.4 and 26.4 centistokes.

The liquid fuels in which the alkylene polymers of this invention may be incorporated thus comprise at least 95% by weight of admixture of hydrocarbons having a boiling range between the limits of 75° F. and 750° F. and a viscosity between the limits of 0.264 and 26.4 centistokes at 100° F.

The following examples are presented for purposes of illustration and not of limitation.

Various amounts of the alkylene polymer of Example 4 having a molecular weight of 5,000 and 37% branching are blended into various commercial grade middle distillates fuels having typical boiling point ranges of from about 250–750° C. The improvements obtained by adding the alkylene polymer in accordance with the present invention is set forth in the following table. All pour points are obtained by ASTM Method D–97–41.

TABLE II

Fuel #1

| P.p.m. alkylene polymer: | Pour point, ° F. |
|---|---|
| 0 | −10 |
| 67 | −15 |
| 133 | −20 |
| 200 | −25 |

Fuel #2

| | |
|---|---|
| 0 | −10 |
| 33 | −15 |
| 50 | −25 |
| 67 | −30 |
| 100 | −40 |

Fuel #3

| | |
|---|---|
| 0 | +5 |
| 67 | −10 |
| 133 | −20 |
| 167 | −25 |

Other fuel oils are similarly enhanced by other alkylene polymers described herein. Thus the pour points of various fuels are enhanced by employing corresponding amounts of the alkylene polymers produced in Examples 1 through 13.

The amount of alkylene polymer employed as a pour point depressant will vary with the particular polymer and the particular fuel employed. In general we employ at least about 20 p.p.m., such as from about 20–5000 p.p.m., advantageously from about 30–3,000 p.p.m. for example from 50–500 p.p.m. with an optimum of 100–300 p.p.m. Larger or smaller amounts can be employed but the amount employed in practice is determined by economic considerations.

OTHER USES

The branched alkylene polymers of this invention are also useful as additives for other systems in which it is desirable to control the growth of crystals coming out of solution. They are particularly useful in hydrocarbon systems such as petroleum systems from which wax crystals separate. By controlling crystal growth, desirable attributes are imparted to the system.

The following are non-limiting examples of such systems:

(1) Use in microcrystalline wax

This invention also relates to wax compositions, and is more particularly directed to microcrystalline waxes having a minor quantity of the above alkylene polymers incorporated therein.

Microcrystalline waxes derived from petroleum are well known and have been employed for many uses. Attempts have been made to use microcrystalline waxes for preparing molds used for the precision casting of metal articles. Such attempts, however, are often not entirely satisfactory, since wrinkles form on the surface of microcrystalline waxes when they are solidified from the molten state. Accordingly, when used for the preparation of molds for subsequent use in precision metal casting, wrinkles formed in the wax surface are impressed upon the surface of the mold. The wrinkled surface of the mold in turn impresses a wrinkled surface on the metal or metal alloy cast thereon. The resulting metal casting must then be machined to achieve a smooth surface.

This phase of the present invention provides a new microcrystalline wax composition especially suitable for use in producing molds which can be used for the precision casting of metal articles.

The incorporation of a minor quantity of the above alkylene polymer in a microcrystalline wax of petroleum origin yields a microcrystalline wax composition having improved properties. Thus, the microcrystalline wax compositions of this invention form a smooth, wrinkle-free surface when solidified from the molten state. The resulting smooth surface renders the new wax compositions especially suitable for the preparation of molds for the precision casting of metal articles. Since the surface imparted to the mold by the wax is smooth, the surface of the resulting metal casting is smooth and does not require machining.

Microcrystalline waxes which can be used to prepare the compositions of the invention are derived from the heavy fractions of petroleum, residual fractions producing especially suitable waxes. The microcrystalline waxes which can be used should have a melting point of at least 135° F., and preferably of at least 150° F., for example from about 150° F. to 198° F. The viscosity of the microcrystalline wax should be above about 55 SUS at 210° F. The oil content of the wax should be less than about 5%, and is preferably less than about 2%. The microcrystalline waxes are generally prepared by dewaxing a petroleum residuum fraction. Advantageously this is accomplished by dissolving a petroleum residuum fraction in a dewaxing solvent such as methyl ethyl ketone, and chilling the resulting solution to a relatively low temperature, say from about 5° F. to −20° F., to precipitate a major portion of the wax therefrom. The resulting microcrystalline wax can advantageously be subjected to additional deoiling steps such as by further dissolution in a solvent and crystallization at a relatively low temperature, or by repulping the wax in a solvent and separating the wax from solvent.

The entire portion of the microcrystalline wax so prepared can be employed to prepare the composition of the invention, or any fraction separated therefrom such as by fractional crystallization, and blends of such fractions, can be used. It is especially advantageous to use blends of microcrystalline wax having different physical properties, such as different melting points, in order to obtain specifically desired properties of the final wax product, in addition to the ability of the final wax composition of the invention to form smooth surfaces.

(2) Use as a refinery dewaxing aid

This invention also relates to the use of alkylene polymers as dewaxing aids for refineries. They produce a well-defined, more uniformly sized wax crystal that can be readily filtered to a compact, but porous cake which is easily washed and dried. The refiner can use dewaxing aids to increase plant capacity during peak demand periods or use them to run the plant more efficiently during slack periods.

These alkylene polymers offer the refiner one or more of the following process improvements:

(a) Increased filter rates
(b) Higher dewaxed oil yields
(c) Lower oil content waxes
(d) Reduced solvent dilution
(e) Improved wax yields In one aspect, this invention relates to an improved process for the dewaxing of oils. In another aspect, the invention relates to the utilization of the above alkylene polymer in a dewaxing system. In still another aspect, the invention relates to the utilization of alkylene polymers in the reclaimed solvent in a dewaxing operation. In a further aspect, the invention relates to the operation of a dewaxing system at lower temperatures without plugging the filter by adding our alkylene polymers to the solvent prior to the cooling of the solvent.

In the solvent dewaxing of hydrocarbon oils, a diluent material is added to the waxy oil, and the solution is then chilled to a temperature at which the wax or a substantial portion thereof is precipitated. The wax is then separated from the oil by filtration, centrifuging or the like. In certain of the methods, known as solvent dewaxing methods, a solvent which has a preferential solvent action for oil over wax at low temperatures, is utilized as the diluent. Solvents which can be utilized include naphthas, ketones such as methylethyl ketone, acetone-benzene mixtures, acetone-toluene mixtures, liquid paraffins of low boiling point such as propane, butane, pentane, and hexane, and chlorinated hydrocarbons such as dichloroethane and trichloroethane. These solvents, being very fluid at low temperaures, reduce the viscosity of the oil to such an extent that low temperatures can be obtained during the precipitation process, and as a result low pour-point oils can be obtained.

In the operation of dewaxing systems, the quantity of wax extracted is directly governed by the temperature to which the wax-hearing stock is cooled, that is, the colder the temperature the more wax is precipitated from the solution. However, there are certain limitations controlling the coldest temperature obtainable. In the solvent dewaxing of certain crudes, such as Venezuelan crude, there is a tendency for the solvent cooler to become plugged, the exchangers to become fouled resulting in increased pressure drop across the exchangers, and the time required for filtration to be increased. The lower limits on temperature on the scraped surface exchanger product slurry have been 30–35° F. as lower temperatures increase the pressure drop across the exchanger and force a shutdown for dewaxing of the exchanger. In certain operations, the solvent which is recycled from the oily filtrate and finished wax strippers, contains a small amount (about 6 percent) light wax which is carried overhead with the solvent in the stripping operation, since perfect fractionation is not obtained and would require considerably more expensive fractionation equipment. It is the precipitation of the light wax in the solvent which plugs the solvent cooler, thus limiting the total cooling of the system and hampers the operation of the exchangers and the filters.

We have found that these difficulties can be reduced or eliminated and the dewaxing operation carried out at lower temperatures than previously obtainable by the addition of our alkylene polymers.

(3) Control of paraffin deposition in the petroleum industry

This present invention also relates to a method for preventing the deposition in oil well production equipment, etc. of the paraffin-like solid hydrocarbon materials contained in petroliferous fluids. More particularly, it relates to the use of our alkylene polymers as paraffin deposition inhibiting agents.

The problem of "paraffin" deposition has been one of long standing in many phases of the oil industry. The so-called "paraffin" deposition occurs in flow lines, in pumping rods, tubing, and at other points which come in contact with the crude oil. The term "paraffin" as used in this context by those skilled in the art, refers to any material which is insoluble or undispersible in crude oil under conditions of production. Thus, the "paraffin" deposit may contain high molecular weight aliphatic hydrocarbons (straight and branched chains), resins, asphaltic materials, aromatic hydrocarbons, oil, inorganic scale, water and sand. As will be understood of course, the composition of such a deposit varies from one crude oil type to another, from one well to another in the same area, and from one geographic location to another.

The present invention provides a novel method of preventing, controlling, or removing paraffin deposits in oil well production equipment and provides a safe, economic, continuous method of preventing the deposition of paraffin by incorporating the polyalkylene polymers into the system.

(4) The alkylene polymers of this invention can also be employed as pour points and viscosity index improvers in mineral lubricating oils In all of these applications a sufficient amount of polyalkylene polymer is incorporated to effect the desired results. In practice and for economic reasons a minimum amount is incorporated so as to effect this result. In general, one employs at least 10 p.p.m. to 2% or more such as from 100 p.p.m. to 10,000 p.p.m. In certain instances greater amounts can be employed where certain results are desired and the economic advantage obtained warrants such use. For example any of the alkylene polymers described in Examples 1–13 can be employed.

We have thus presented specific examples of uses in which the alkylene polymers of this invention can be employed. In general, these polymers are useful in applications in which the deposition of waxes from liquid, such as hydrocarbon, presents a problem. The alkylene polymer of this invention can advantageously modify the structure of the wax crystals to solve these problems.

As is quite evident, other uses as wax modifiers exist or will be constantly developed in which our polymers can be useful. It is, therefore, not only impossible to attempt a comprehensive catalogue of such uses, but to attempt to describe the invention in its broader aspects in terms of all such uses would be too voluminous and unnecessary since one skilled in the art could by following the description of the invention herein adapt our polymers to other uses as wax modifiers. This invention lies in the use of alkylene polymers of this invention in which they can function as wax modifiers so as to enhance the particular system. To precisely define each specific use in light of the present disclosure would merely call for knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of these alkylene polymers to other systems. In analogy to the case of a machine, wherein the use of certain materials of construction or dimensions of parts would lead to no practical useful result, various uses will be rejected as inapplicable while others would be operative. We can obviously assume that no one will wish to be misled because it is possible to misapply the teachings of the present disclosure to do so.

Although this invention has been described in terms of branched alkylene polymers derived from butadiene, other branched alkylene polymers can also be prepared in accord with this invention.

These can be employed for the uses specified herein. Thus, other branched alkylene polymers having the desired correlation between branching and molecular weight can be prepared by polymerizing a suitable combination of two or more olefins. For example, ethylene and butene-1 can be polymerized. Similarly ethylene, butadiene, and butene-1 can be polymerized to form a ter-polymer which can be hydrogenated.

Although the invention has been described in terms of ethyl side chains, other side chains besides ethyl can be employed.

For example, the branched chain may contain alkyl groups other than ethyl, for example propyl, butyl, pentyl, hexyl, heptyl, octyl, nonyl, decyl, undecyl, dodecyl, tridecyl, including isomers thereof, etc.; cycloalkyl for example alkyl cyclohexyl, dialkyl cyclohexyl, where the alkyl groups are methyl, ethyl, propyl, etc.; aryl for example phenyl, alkylphenyl, etc.; combinations of different side chains such as ethyl and butyl; ethyl and propyl; propyl and hexyl, etc.

For example, depending on the particular polymer molecular weights of about 1,000 to 50,000 or greater in which about 5–55% of the total polymeric units contain side chains can be employed.

Polymers containing these groups are readily prepared by copolymerizing α-olefins using "Ziegler type" catalyst systems.

Having thus described our invention what we claim as new and desire to obtain by Letters Patent is:

1. A hydrocarbon system normally subject to the uncontrolled deposition of wax, wherein the hydrocarbon is present in a major amount and contains wax, which is improved by the presence therein of the composition, in an amount sufficient to control deposition of the wax from said hydrocarbon, comprising alkylene polymers characterized by (1) a molecular weight of about 1,000–50,000 (2) about 90–45% $\text{-(CH}_2\text{---CH}_2\text{---CH}_2\text{---CH}_2\text{)-}$ units, and (3) about 10–55%

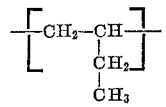

units.

2. The hydrocarbon system of claim 1 where (1) is about 2,000–12,500 and (2) is about 80–55% and (3) is about 20–45%.

3. The hydrocarbon system of claim 1 where (1) is about 3,000–10,000 and (2) is about 65–60% and (3) is about 35–40%.

4. The system of claim 3 where (1) is about 7000–8,000.

5. The hydrocarbon system of claim 1 which is characterized by an improved pour point.

6. The hydrocarbon system of claim 1 where the hydrocarbon system is a petroleum distillate of improved pour point.

7. The hydrocarbon system of claim 2 where the hydrocarbon system is a petroleum distillate of improved pour point.

8. The hydrocarbon system of claim 3 where the hydrocarbon system is a petroleum distillate of improved pour point.

9. The hydrocarbon system of claim 4 where the hydrocarbon system is a petroleum distillate of improved pour point.

10. The hydrocarbon system of claim 1 wherein (1) is about 1,500–20,000 (2) is about 85–50% and (3) is about 15–50%.

11. The hydrocarbon system of claim 1 where the hydrocarbon system is a lube oil.

12. The hydrocarbon system of claim 10 wherein the hydrocarbon system is a petroleum distillate of improved pour point.

References Cited

Kalichevsky et al.: "Petroleum Refining With Chemicals," Elsevier Pub. Co. (1956), page 541.

Foster et al.: "Lithium and Other Alkali Metal Polym. Catalysts," Advances in Chemistry Series—Am. Chem. Soc., vol. 19 (1957), pp. 26 to 29.

Kuntz et al.: "The Butyllithium-Initiated Polym. of 1,3-Butadiene," Jour of Polymer Science, vol. 42 (1960), pp. 299–307.

DANIEL E. WYMAN, Primary Examiner

W. H. CANNON, Assistant Examiner

U.S. Cl. X.R.

44—62; 208—33, 38